3,388,412
METHOD AND APPARATUS FOR ASSEMBLING MULTI-PART WORKPIECES

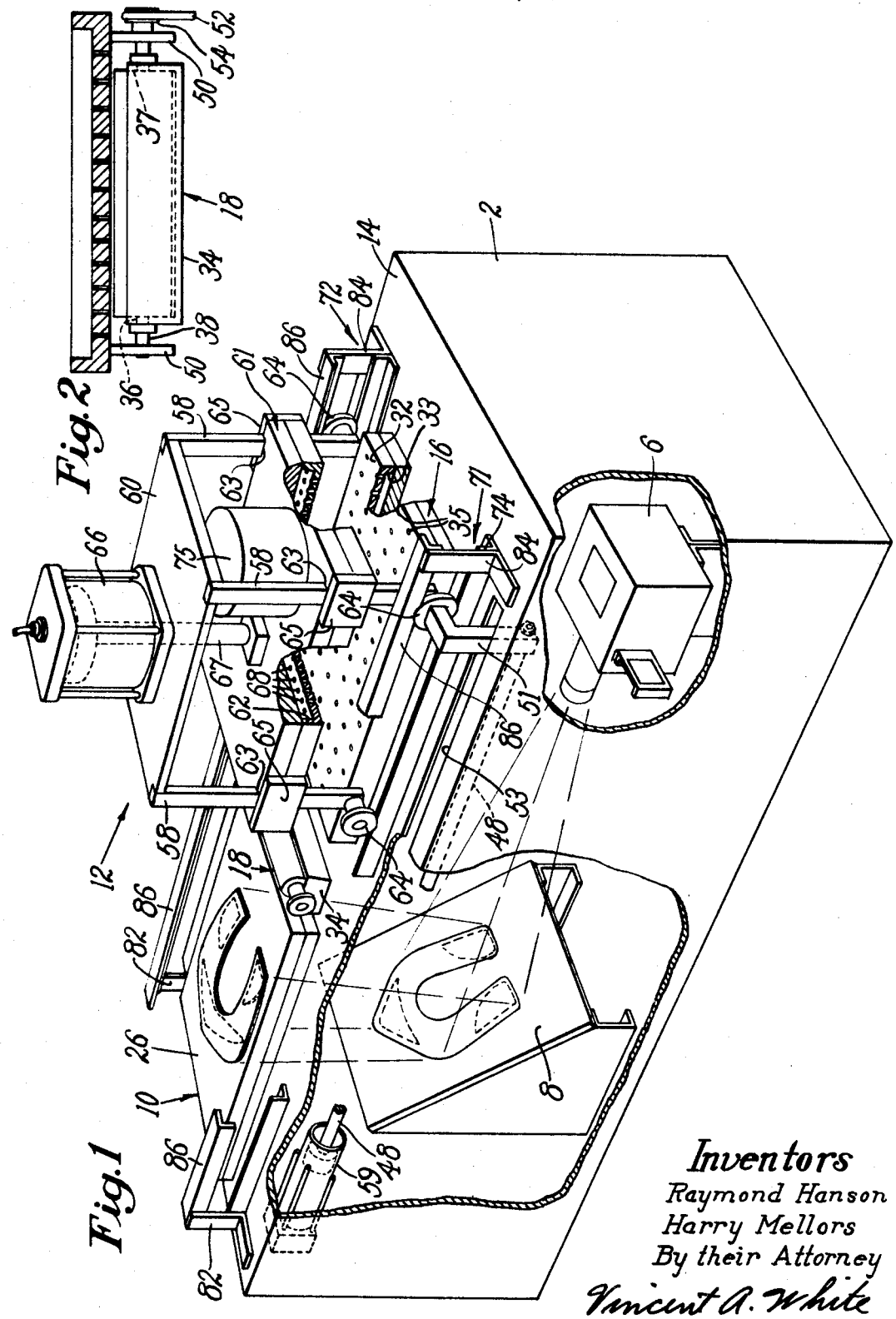

Raymond Hanson and Harry Mellors, Leicester, England, assignors to United Shoe Machinery Corporation, Flemington, N.J., and Boston, Mass., a corporation of New Jersey
Filed Dec. 2, 1966, Ser. No. 598,863
Claims priority, application Great Britain, Dec. 11, 1965, 52,689/65
12 Claims. (Cl. 12—146)

ABSTRACT OF THE DISCLOSURE

A method for assembling component parts of a shoe upper comprising orienting the parts on an image projected on a screen, transferring the parts from the screen and into superposed and oriented relation on a platen, applying adhesive to selected parts, and pressing the superposed parts together to form an assembled upper. A shoe upper assembling machine comprising a screen having a projected image for orienting separate parts of the upper and a suction mechanism for transferring the oriented parts to a platen where the parts are bonded together by pressure to form an assembled upper.

Background of the invention

It has long been conventional to assemble the component parts of a shoe upper by a succession of stitching and sewing operations. Since such operations are time consuming and require skill and close supervision, it has been proposed that bonding techniques could be used instead. One method proposed involves assembling the shoe upper parts such as a main upper component and heel and toe stiffeners as well as a lining material in flat condition and alternatively bonding the components together under pressure.

Summary of the invention

It is a general object of the invention to provide a method and apparatus adapted for the assembly of separate parts of a shoe upper and bonding them together.

To this end, the method generally provides for placing each part of a shoe upper on a screen in oriented relation to an image projected on the screen, transferring each part from the screen and into superposed and oriented relation on a platen, applying adhesive to selected parts, and finally bonding the superposed parts together with pressure to form an assembled upper. The apparatus for carrying out the method generally comprises a cabinet on which is mounted an orienting screen and an assembly platen. The component orienting means is provided by a projector and a mirror reflector adapted to project an image of the various parts of an upper on the screen. After orientation of the parts, a transfer mechanism moves each part from the screen to an assembly platen. So the parts may be bonded together, an adhesive applying means is arranged between the screen and the platen whereby selected parts are coated with adhesive as they are transferred to the platen. Means are provided for pressing the oriented and assembled parts on the platen for bonding them together into an assembled upper.

The above and other features of the invention together with novel details of construction and combinations of parts will now be described with particular reference to the accompanying drawings in which:

FIG. 1 is a perspective view of the illustrative apparatus; and

FIG. 2 is a sectional view of the adhesive applying device shown in FIG. 1.

Description of the preferred embodiments

The apparatus illustrated is adapted for use in assembling and bonding component parts together to form a composite flat article, and is especially adapted for use in assembling and bonding together component parts of a shoe upper. Each of the component parts is accurately placed one on top of the other in such a manner that successive units assembled on the apparatus and according to the method are identical.

As shown in FIG. 1, the apparatus comprises a box-like cabinet 2 forming a rigid structure assembled on a frame (not shown). The upper wall 14 of the cabinet is provided with an opening which receives a screen 10 forming an orienting surface 26. Fixed within the cabinet is a projector 6 and a reflector 8 for projecting an image of the outline and component parts of an upper assembly on the screen. The component parts of the shoe upper are positioned on the surface 26 oriented with respect to the projected image.

The upper wall 14 of the cabinet also has fixed thereto an assembly platen 16 having an upper surface 32 substantially coplanar with the surface 26 of the screen. The platen is provided with an interior cavity 33 and a plurality of holes 35 which extend from the cavity to the surface 32. The holes are of a suitable diameter and spaced apart sufficiently so that a vacuum pump (not shown) connected to the cavity creates a sub-atmospheric pressure in the cavity. Suction force through the holes 35 acts to hold a component part of the upper deposited on the surface 32.

A cement applying device 18 is also mounted on the cabinet between the screen 10 and the assembly platen 16. The device 18 (FIG. 2) comprises a rectangular adhesive tray 34 provided with slots 36, 37 in its end walls. A rod 38 is mounted for rotation in the slots and carries an applicator roll 46 which rests in the adhesive in the tray. The roll is adapted by means (not shown) to be moved bodily heightwise in the slots 36, 37 to an upper work engaging position and a lower position retracted in the tray. The rod 38 at opposite ends is also provided with rollers 50 having a diameter greater than that of the applicator roll 46 to accommodate the thickness of one of the component parts of the shoe upper as will presently appear. For rotating the roll the rod 38 is provided with a pulley 54 which receives a belt 52 also mounted on a pulley of a motor (not shown).

During the operation of the apparatus successive parts oriented on the screen are carried past the adhesive roll and deposited on the platen. To this end a transfer mechanism 12 is mounted for linear movement along rail assemblies 71 and 72 carried on brackets 82, 84 fixed on the upper surface 14 of the cabinet. The rail assemblies extend lengthwise of the cabinet and outside the table 16 and screen 10, each assembly comprising an L-shaped bar 74 and an inverted L-shaped bar 86. The transfer mechanism is mounted on four columns 58 having at their lower ends flanged rolls 64. One pair of rolls is adapted to roll between the bars 74 and 86 of the rail assembly 71 while the other pair of rolls rides between the bars of the assembly 72. Thus, it may be seen that the transfer mechanism is mounted for linear movement between the screen 10 and platen 16. For reciprocating the transfer mechanism between one position overlying the table 16 and another position overlying the screen 10, one of the bars 58 carries a bracket 51 to which is fixed one end of a piston rod 48 connected to the piston of a cylinder 59 fixed within the cabinet. The wall 14 of the cabinet is provided with a slot 53 to permit movement of the bracket 51.

The transfer mechanism is adapted to grip an upper part at its oriented position on the screen 10 and deposit it on the assembly platen 16. To this end a hollow box 61 is mounted for heightwise movement on the columns 58. The box has grooves 63 which receive the columns and is provided with caps 65 to form guideways for heightwise movement. Secured to the upper face of the box 61 is a piston rod 67 which passes through a bore in an upper plate 60 on the columns and is secured to a piston in a cylinder 66 fixed on the upper surface of the plate 60. The box 61 is provided with a cavity 62 connected to a vacuum pump 75 mounted on the upper surface of the box, the lower surface of the box being provided with a plurality of holes 68 through which a suction is applied to grip the component parts of a shoe upper upon engagement by the box and to maintain them in oriented condition while being transferred from the screen 10 to a position overlying the platen 16.

An operating sequence will now be described to illustrate the operation of the apparatus as well as the method aspects of the invention. In a complete operating sequence component parts of a shoe upper are moved one at a time from the screen 10 to the assembly platen 16 by the transfer mechanism 12. To initiate the operation, a supply of air under pressure is introduced to the cylinder 59 causing the transfer mechanism to be moved along the rail assemblies to a position overlying the assembly platen 16. A spring (not shown) in the cylinder 66 acts at this time to hold the box 61 raised from the assembly platen. A first photographic slide of a set is placed in the projector 6 which, through the reflector 8, projects an image of the outline of the upper on the screen 10. The operator places an upper on the screen accurately overlying and oriented with the projected image and thereafter initiates a pneumatic cycle of operation during which the following movements are effected. The transfer mechanism 12 is moved from its position overlying the platen 16 to a position overlying the screen. Pressurized air is then admitted to the upper portion of cylinder 66 causing the box 61 to be lowered into engagement with the oriented shoe part on the screen 10. At this point the vacuum motor 75 is automatically actuated, causing a suction force to be applied through the holes 68 in the lower surface of the box (thereby gripping the shoe part. The air pressure to the cylinder 66 is then released, raising the box 61 and lifting the shoe part from the screen. Thereafter the air connections to the cylinder 59 are reversed, causing the transfer mechanism to be moved along the rails 71, 72 to a predetermined position overlying the assembly platen 16. The box 61 is then lowered by admission of air to cylinder 66 and the vacuum motor 75 is de-energized to deposit the part on the assembly platen 16. After the part is deposited, the vacuum pump associated with the assembly platen is energized and the suction passing through the holes 35 in the platen acts to hold the part in its oriented position on the platen.

While the above sequence is taking place the first slide in the projector is replaced by a second slide. The image being projected on the screen is then depicting, for example, the toe and heel end stiffener pieces in their proper relation to the outline of the upper part previously projected. The operator then places the stiffener pieces on the screen oriented over their respective images projected thereon and the operating cycle is repeated to cause these pieces to be transferred from the screen 10 and placed on the upper part previously deposited on the platen 16. In transferring these components, the box 61 moves through the same distance as when it carried the first upper part, and consequently the stiffener pieces are accurately superposed on the first upper part.

As the stiffener pieces are being transferred, they are coated on one side with adhesive. To this end, the operator causes the applicator roll 46 to be raised into the path of movement of the stiffener pieces thereby applying adhesive to the pieces from the tray 34. Alternately the operator can limit the height to which the box is raised from the screen so that the rollers 50 engage the undersurface of the box thereby also causing adhesive to be applied to the stiffener pieces in a thickness determined by the relative diameters of the roll 46 and rollers 50.

It should be understood that other means of applying adhesive or other bonding media may be used without departing from the scope of the invention. For example, a hot melt adhesive may be applied during transfer of the component parts in a manner similar to the application of adhesive of a solvent activated type. Alternately a thermoplastic film adhesive may be transferred as a component part after being suitably oriented on the screen and means provided to activate the film by heat subsequently when the component parts are pressed together on the platen. Activation of a thermoplastic film or similar activation of a thermoplastic cement with which the component part can be pre-coated may be provided by a high frequency field established by suitably disposed electrodes. Component parts pre-cemented with solvent activatable cement may also be used and be activated as they pass over a saturated roll dipping into solvent. A solvent based cement may also as an alternative be coated on the component parts as they pass over the roll and the film so formed reactivated, if necessary, by heat when the component parts are pressed together.

By repeating the operating sequence of the apparatus a lining material may also be coated with adhesive and accurately placed overlying the other component parts on the platen. When all parts for the composite upper are assembled on the platen the final downward movement of the box 61 may be exerted at a greater pressure and heat applied at this time, if necessary, to bond the component parts together into a single composite shoe upper.

As each component part is deposited on the assembly platen it may be desired that moderate pressure be applied to the component parts, for example, when the stiffener pieces have been pressed lightly to bond them together to prevent displacement during subsequent operations. To this end, the cylinder 66 may be provided with a control valve which can be adjusted by the operator or automatically actuated in response to sequencing signals as the transfer mechanism moves in successive operations to vary the pressure in the cylinder 66.

It should be understood that a single slide with suitable outline markings on it to represent the positions of all the component parts may be used instead of using a succession of different slides each representing one of the component parts. Also, optical means may be provided for varying the size of the image on the screen to suit different sizes of shoe uppers. Moreover, uppers for left and right shoes can be accurately assembled by reversing the same slide or slides in the projector.

Having thus described our invention, what we claim as new and desire to secure by Letters Patent of the United States is:

1. A method for assembling a multi-part workpiece comprising, projecting images of each part of the workpiece on a screen, positioning each part separately on the screen oriented with a corresponding image, transferring each oriented part a predetermined distance from the screen to a location where the parts are superposed in oriented relation, and bonding the superposed parts together to form the multi-part workpiece.

2. A method according to claim 1 in which is included a step of applying a bonding medium to selected parts before the bonding step.

3. A method according to claim 1 in which are included the steps of precoating selected parts with a bonding medium before positioning on the screen and applying an activating medium to the coated parts before the bonding step.

4. A method according to claim 1 in which are included the steps of precoating selected parts with a bonding medium before positioning on the screen and activating said medium during the bonding step.

5. A method according to claim 1 in which are included the steps of inserting a bonding medium in sheet form between selected parts and activating said medium during the bonding step.

6. Apparatus for assembling a multi-part workpiece comprising a screen on which parts of the workpiece are placed, means for projecting on the screen images relative to which the parts are oriented; a platen; a device movable between predetermined positions overlying alternately the screen and the platen, said device having means for gripping the oriented parts when the device overlies the screen and for depositing the parts in oriented relation on said platen when the device overlies the platen; means for moving the device in successive cycles for transferring successive parts oriented on the screen to oriented and superposed relation on the platen, and means for pressing the superposed parts on the platen for bonding together to form an assembled workpiece.

7. Apparatus according to claim 6 in which the gripping and depositing means includes a plate engageable with the parts oriented on the screen, said plate having a plurality of holes through which a suction is applied for gripping the oriented parts.

8. Apparatus according to claim 7 in which the plate is movable toward and away from the planes of the screen and the platen for gripping the parts when the device overlies the screen and for depositing and pressing the parts in superposed relation when the device overlies the platen.

9. Apparatus according to claim 7 in which a variable fluid pressure cylinder is provided for moving the plate toward the screen and platen to apply a light pressure for engaging and gripping the parts on the screen and for depositing the parts on the platen, and to apply a greater pressure for pressing the superposed parts on the platen for bonding together into an assembled workpiece.

10. Apparatus according to claim 6 in which means is provided for applying adhesive to selected parts during the transfer movement of the parts from the screen to the platen.

11. Apparatus according to claim 10 in which the applying means comprises a roll mounted in a trough containing adhesive, and movable selectively into and out of the path of transfer movement of the parts.

12. Apparatus according to claim 6 in which the platen is provided with a plurality of holes through which a suction is applied for maintaining the parts in oriented position after deposition on the platen.

References Cited

UNITED STATES PATENTS

| | | | |
|---|---|---|---|
| 1,825,379 | 9/1931 | Zonino | 12—146 |
| 2,006,071 | 6/1935 | Edwards | 12—52 |
| 2,263,337 | 11/1941 | Kamborian | 12—52 |
| 3,329,983 | 7/1967 | Clamp | 12—146 |

PATRICK D. LAWSON, *Primary Examiner.*